United States Patent
O'Neal et al.

(10) Patent No.: US 9,299,247 B2
(45) Date of Patent: Mar. 29, 2016

(54) SYSTEM AND METHOD FOR ADJUSTING MACHINE PARAMETERS

(75) Inventors: Steven Wayne O'Neal, Bartonville, IL (US); Trent Ray Meiss, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 2068 days.

(21) Appl. No.: 12/008,780

(22) Filed: Jan. 14, 2008

(65) Prior Publication Data

US 2009/0182460 A1      Jul. 16, 2009

(51) Int. Cl.
| | |
|---|---|
| *G06F 17/00* | (2006.01) |
| *G06F 21/30* | (2013.01) |
| *G08C 17/00* | (2006.01) |
| *B60R 25/00* | (2013.01) |
| *G06F 21/35* | (2013.01) |

(52) U.S. Cl.
CPC ............... *G08C 17/00* (2013.01); *B60R 25/00* (2013.01); *B60R 2325/10* (2013.01); *G06F 21/35* (2013.01); *G08C 2201/50* (2013.01); *G08C 2201/51* (2013.01)

(58) Field of Classification Search
CPC ............... B60R 25/00; B60R 2325/10; B60R 2325/101; B60R 2325/103; B60R 2325/105
USPC ................... 701/2, 45, 50; 180/271, 272, 287; 70/256; 200/43.01, 43.03; 340/426.1, 340/426.13, 426.16, 426.17, 426.35; 455/410, 411
See application file for complete search history.

(56) References Cited

U.S. PATENT DOCUMENTS

| | | | |
|---|---|---|---|
| 5,579,227 A | 11/1996 | Simmons, Jr. et al. | |
| 5,808,907 A | 9/1998 | Shetty et al. | |
| 6,032,093 A | 2/2000 | Denbraber et al. | |
| 6,131,062 A * | 10/2000 | Nielsen | 701/50 |
| 6,236,909 B1 | 5/2001 | Colson et al. | |
| 6,249,727 B1 | 6/2001 | Muller | |
| 6,756,912 B2 | 6/2004 | Skiver et al. | |
| 6,917,846 B1 | 7/2005 | Muller | |
| 7,020,553 B2 | 3/2006 | Nakamura et al. | |
| 7,091,825 B2 * | 8/2006 | Sahai | 340/5.72 |
| 7,228,122 B2 * | 6/2007 | Oyagi et al. | 455/411 |
| 7,273,125 B2 | 9/2007 | Schuh | |
| 7,454,545 B2 * | 11/2008 | Kohno et al. | 710/72 |
| 7,757,803 B2 * | 7/2010 | Fiske et al. | 180/271 |
| 2002/0011013 A1 * | 1/2002 | Sawada et al. | 37/443 |
| 2002/0133716 A1 * | 9/2002 | Harif | 713/201 |

(Continued)

FOREIGN PATENT DOCUMENTS

JP     2004224265 A  *  8/2004  .............. B60R 25/00

*Primary Examiner* — Thomas G Black
*Assistant Examiner* — Peter D Nolan
(74) *Attorney, Agent, or Firm* — Finnegan, Henderson, Farabow, Garrett & Dunner, LLP (57) ABSTRACT

A system for adjusting machine parameters based on a skill level of an operator comprises a personal area network (PAN)-compatible electronic control module (ECM) located on a machine. The system also includes a PAN-compatible communication device associated with an operator of the machine. The PAN-compatible communication device is configured to receive information indicative of the skill level of the operator. The PAN-compatible communication device is also configured to establish a wireless communication link with the PAN-compatible ECM and transmit the information indicative of the skill level of the operator to the PAN-compatible ECM. The PAN-compatible ECM is configured to adjust an operational aspect of the machine based on the information indicative of the skill level of the operator of the machine.

23 Claims, 3 Drawing Sheets

(56) References Cited

U.S. PATENT DOCUMENTS

| | | |
|---|---|---|
| 2005/0246040 A1* | 11/2005 | Horkavi et al. .................. 700/83 |
| 2005/0283295 A1 | 12/2005 | Normann |
| 2006/0047377 A1 | 3/2006 | Ferguson et al. |
| 2006/0136110 A1 | 6/2006 | Casey et al. |
| 2006/0271263 A1 | 11/2006 | Self et al. |
| 2007/0038355 A1 | 2/2007 | Brandt et al. |
| 2007/0050115 A1 | 3/2007 | Discenzo et al. |
| 2007/0197194 A1* | 8/2007 | Oyagi et al. .................. 455/411 |
| 2007/0200663 A1* | 8/2007 | White et al. .................. 340/5.31 |
| 2007/0239992 A1* | 10/2007 | White et al. .................. 713/186 |
| 2008/0150683 A1* | 6/2008 | Mikan et al. .................. 340/5.31 |

\* cited by examiner

SYSTEM AND METHOD FOR ADJUSTING MACHINE PARAMETERS

TECHNICAL FIELD

The present disclosure relates generally to condition monitoring and telemetry systems for on-highway and off-highway machines and, more particularly, to systems and methods for adjusting operational parameters of a machine based on a skill level of a machine operator.

BACKGROUND

Many modern machines may be equipped and/or customized with capabilities or features that allow experienced operators to more efficiently perform certain tasks associated with the machine. Such capabilities and features, which may be properly executed or utilized by experienced machine operators, are often improperly employed by inexperienced machine operators. Improper use of certain machine capabilities may lead to inefficient machine operation, excessive wear to machine components, and, potentially, damage to the machine.

Some systems have been developed for adjusting and/or customizing certain machine features based on the skill level and/or experience of the operator. One such system is described in U.S. Pat. No. 6,756,912 ("the '912 patent") to Skiver et al. The '912 patent describes an information display system for a vehicle rear view mirror assembly. The system of the '912 patent may prompt vehicle drivers for identification and set a speed limit for the vehicle based on skill level, age, and driving record of the driver. The speed limit may be displayed on the vehicle rear view mirror assembly aside the actual speed of the machine, thereby notifying the driver of actual speed of the vehicle in comparison with the customized driver speed limit.

Although the system of the '912 patent may efficiently customize certain operational parameters of a vehicle based on driver skill level for vehicles that involve a small number of drivers, it may be insufficient for large machine fleets where many different drivers may operate a single vehicle. For example, the system of the '912 patent requires that profiles for each driver be defined in the system and associated with a driver identification that, when entered by the driver prior to or during vehicle operation, retrieves the driver profile. Although programming driver profiles for each vehicle driver may not be particularly cumbersome when there are a limited number of drivers authorized to use a particular vehicle, it may be time-consuming for project environments that may have large numbers of machines, each machine supporting a large number of authorized operators.

Furthermore, in certain professional working environments, skill level, experience, and training levels for vehicle operators may change very rapidly. Manually managing and updating driver profiles for each machine in a large fleet of machines each time skill level associated with a single driver changes may be time-consuming, inefficient, and may lead to data entry errors.

The presently disclosed systems and methods for adjusting machine parameters are directed toward overcoming one or more of the problems set forth above.

SUMMARY

In accordance with one aspect, the present disclosure is directed toward a method for adjusting machine parameters based on a skill level of an operator. The method may comprise receiving, by a personal area network (PAN)-compatible communication device, information indicative of a skill level of an operator. The method may also include detecting a PAN-compatible electronic control module (ECM) proximate the PAN-compatible communication device. The information indicative of the skill level of the operator may be transmitted to the detected PAN-compatible ECM, wherein the PAN-compatible ECM is configured to adjust an operational aspect of the machine in response to the information indicative of the skill level of the operator.

According to another aspect, the present disclosure is directed toward a system for adjusting machine parameters based on a skill level of an operator. The system may comprise a personal area network (PAN)-compatible electronic control module (ECM) located on a machine. The system may also include a PAN-compatible communication device associated with an operator of the machine. The PAN-compatible communication device may be configured to receive information indicative of the skill level of the operator. The PAN-compatible communication device may also be configured to establish a wireless communication link with the PAN-compatible ECM and transmit the information indicative of the skill level of the operator to the PAN-compatible ECM. The PAN-compatible ECM may be configured to adjust an operational aspect of the machine based on the information indicative of the skill level of the operator of the machine.

In accordance with another aspect, the present disclosure is directed toward a project environment comprising at least one machine operating in the project environment. The project environment may also include a personal area network (PAN)-compatible electronic control module (ECM) located on the machine and configured to control at least one operational aspect of the machine. The project environment may further include a PAN-compatible communication device associated with an operator of the machine. The PAN-compatible communication device may be configured to receive information indicative of the skill level of the operator and establish a wireless communication link with the PAN-compatible ECM. The PAN-compatible communication device may also be configured to transmit the information indicative of the skill level of the operator to the PAN-compatible ECM. The PAN-compatible ECM may be configured to adjust the at least one operational aspect of the machine based on the information indicative of the skill level of the operator of the machine.

DETAILED DESCRIPTION

Figure 1:
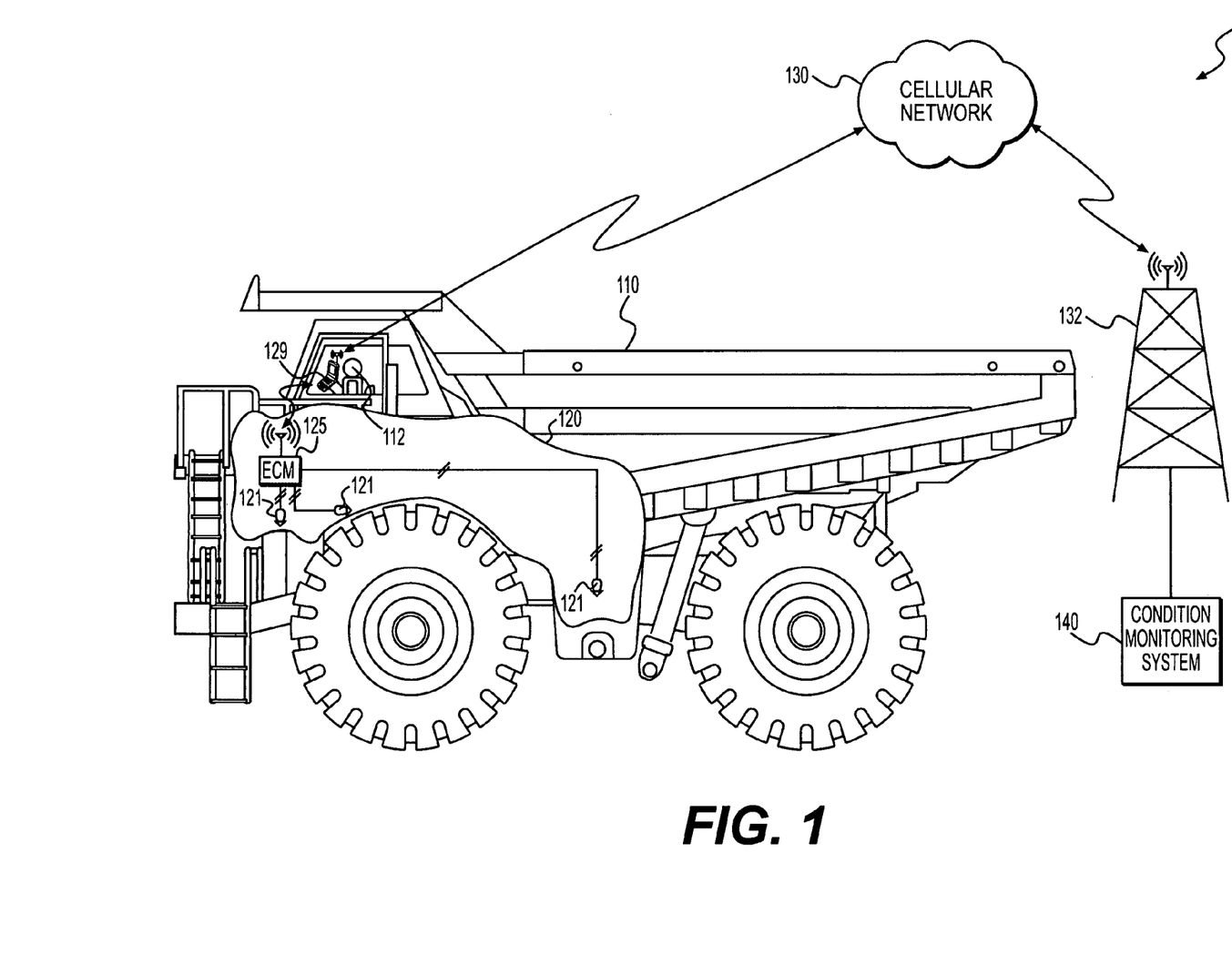
FIG. 1 illustrates an exemplary project environment consistent with the disclosed embodiments.

FIG. 1 illustrates an exemplary project environment 100 consistent with certain disclosed embodiments. Project environment 100 may include one or more components that perform individual tasks that contribute to a machine environment task, such as mining, construction, transportation, agriculture, manufacturing, or any other type of task associated with other types of industries. For example, project environment 100 may include one or more machines 110 coupled to a condition monitoring system 140 via one or more cellular networks 130. The project environment 100 may be configured to monitor, collect, control, and/or filter information associated with an operation of one or more machines 110 and distribute the information to one or more back-end systems, such as condition monitoring system 140. It is contemplated that additional and/or different components than those listed above may be included in project environment 100. For example, project environment 100 may include one or more data subscribers communicatively coupled to condition monitoring system 140 and configured to receive machine operation data from the condition monitoring system 140. Data subscribers may include computer systems associated with a person or entity associated with project environment such as, for example, a machine owner, a project manager, a repair technician, or any other person or entity that may be associated with project environment 100 or one or more machines 110 associated therewith.

Machine 110 may be a fixed or mobile machine configured to perform an operation associated with project environment 100. Thus, machine, as the term is used herein, refers to a fixed or mobile machine that performs some type of operation associated with a particular industry, such as mining, construction, farming, etc. and operates between or within project environments (e.g., construction site, mine site, power plants, etc.) Furthermore, machine 110 may be used to refer to any remote asset operating within or associated with project environment 100. A non-limiting example of a fixed machine includes an engine system operating in a plant, a material conveyer, or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment. A machine may be driven by a combustion engine or an electric motor. The types of machines listed above are exemplary and not intended to be limiting. It is contemplated that project environment 100 may implement any type of machine. Accordingly, although FIG. 1 illustrates machine 110 as a mobile haulage machine, machine 110 may be any type of machine operable to perform a particular function within project environment 100. Machine 110 may be operated by machine operator 112.

Machine 110 may include on-board data collection and communication equipment to monitor, collect, and/or distribute information associated with one or more components of machine 110. According to one embodiment, on-board data collection and communication equipment may include a system 120 for collection and distribution of machine data via a cellular communication device. It is contemplated that machine 110 may include additional on-board data collection and communication equipment. For example, machine 110 may include data monitoring equipment (e.g., sensors, control modules, data collectors, etc.) for monitoring health, productivity, status, and/or performance associated with machine 110.

System 120 may include one or more components configured to receive information indicative of a skill level of an operator from a cellular communication device associated with an operator 112 and adjust machine operating parameters based on the received information. System 120 may also be configured to monitor operation data associated with machine 110, package the monitored operation data for transmission to an off-board system, identify one or more cellular communication devices 129 located proximate system 120, and transmit the operation data to the one or more cellular communication devices 129. System 120 may include, among other things, one or more data monitoring devices 121 for collecting machine operation data and an electronic control module (ECM) 125 or other data collection device for receiving operation data from the one or more monitoring devices 121. System 120 may also include one or more cellular communication devices 129 located proximate system 120.

Figure 2:
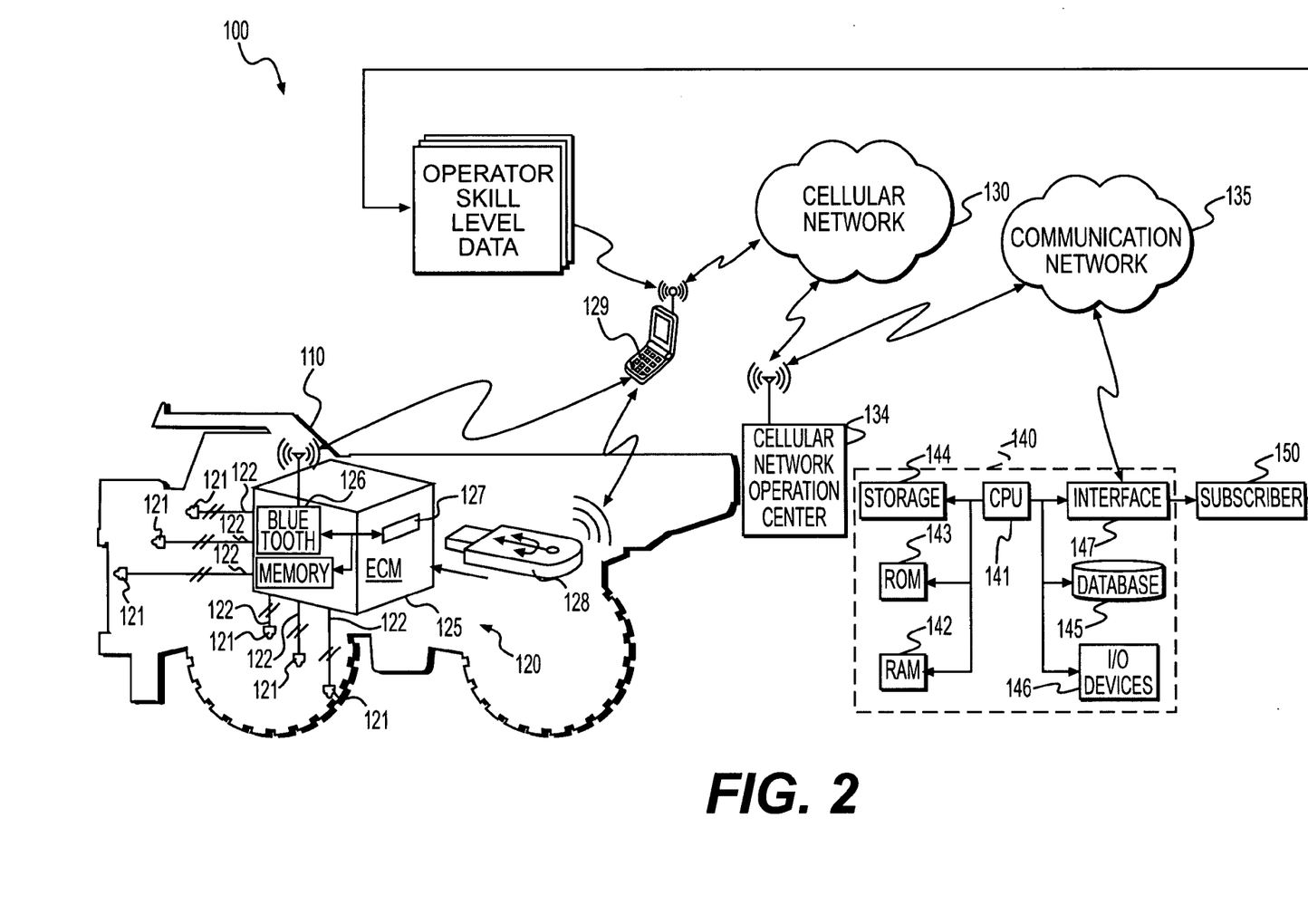
FIG. 2 provides a schematic illustrating certain exemplary components of the project environment of FIG. 1.

As illustrated in the schematic diagram of FIG. 2, project environment 100 may include a plurality of components for adjusting operational parameters associated with a machine based on the skill level of the operator. According to one exemplary embodiment, information indicative of the operator skill level may be stored in one or more cellular communication devices 129 associated with a machine operator. The information may be transferred from cellular communication device 129 to the machine using personal area network (PAN) communication capabilities associated with a cellular communication device 129. Personal area network, as the term is used herein, refers to any close range (e.g., 1 m, 10 m, 100 m, etc.) wireless communication protocol that enables secure communications between or among one or more PAN-approved and compatible devices. Personal area networks may include, for example, Bluetooth devices or other short-range wireless communication devices. It is contemplated, however, that any suitable short-range wireless communication data format may be used to perform PAN-communication capabilities and that specific formats described above are exemplary only and not intended to be limiting.

Information indicative of the skill level of the operator may include any type of data that may be used to determine some aspect of operator skill. Such information may include, for example, an operator experience level (e.g., amount of machine hours logged); operator training level (e.g., amount of training courses attended); an operator risk level (e.g., number of accidents, driving record, amount of machine wear attributed to operator use, etc.); a physical characteristic of the operator (e.g., age, vision level (e.g., 20/20. 20/40, etc.), reflex characteristics (muscle responsiveness)); an operator performance or productivity level; or any other information that may be used to determine an operator skill level. According to one embodiment, information indicative of an operator skill level may include a formula or algorithm that uses one or more of the parameters identified above to calculate a skill factor associated with the operator. Information indicative of the skill level of the operator may be loaded onto cellular communication device 129 automatically by a back-end system, such as condition monitoring system 140 or subscriber 150, or may be programmed by certain authorized project environment personnel (e.g., project manager, machine owner, human resources and/or operator training department, etc.).

According to one exemplary embodiment, project environment 100 may also include a plurality of components and subsystems that cooperate to collect machine operation data and transmit the data to one or more back-end systems using personal area network (PAN) communication capabilities associated with a cellular communication device 129. As shown in FIG. 2, machine 110 may include, among other things, one or more monitoring devices 121 (e.g., sensors or other data collectors); one or more ECMs 125 coupled to monitoring devices 121 via communication lines 122; and/or any other component that may be used for monitoring, collecting, and communicating information associated with the operation of machine 110. Machine 110 may also be configured to exchange information with off-board systems, such as a condition monitoring system 140, via a cellular communication device 129 (e.g., a cellular telephone). The components described above are exemplary and not intended to be limiting. Accordingly, the disclosed embodiments contemplate machine 110 including additional and/or different components than those listed above.

Monitoring devices 121 may include any device for collecting operation data associated with one or more machines 110. For example, monitoring devices 121 may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; haul grade and traction data; drive axle torque; intervals between scheduled or performed maintenance and/or repair operations; and any other operational parameter of machine 110.

ECM 125 may be configured to receive/collect information indicative of the skill level of an operator from a cellular communication device 129 associated with operator 112. According to one embodiment, ECM 125 may be configured to detect a cellular communication device 129 proximate ECM 125, establish a connection with cellular communication device 129, and download operational settings for one or more machine systems or subsystems stored in cellular communication device 129. According to an alternate embodiment, ECM 125 may be configured to receive data indicative of a skill level of an operator, determine, based on the received data, the skill level of the operator, and adjust one or more operational settings that correspond to the determined skill level.

ECM 125 may also be configured to adjust operational parameters associated with machine 110 based on the information indicative of the skill level of the operator. For example, ECM 125 may be configured to limit the groundspeed of the machine based on the weight of the machine payload, in order to prevent inexperienced operators from operating the machine at excessive speeds under certain loading conditions. According to another example, ECM 125 may be configured to prevent or limit the operator from accessing certain gears of the machine, if, for example, excessive risk of premature wear and/or machine damage may result/has previously resulted from improper operation in these gears. In another example, ECM 125 may disable operation of one or more features of the machine and/or make performance of certain features automatic (i.e., not manually controllable by operator 112) if the skill level of the operator is below a minimum skill threshold required for such features. For example, if certain machine maneuvers or features require special training, these maneuvers or features may be disabled if the machine operator has not received the training, thereby preventing untrained machine operators from performing such maneuvers.

ECM 125 may also be configured to receive, collect, package, and/or distribute data collected by monitoring devices 121. Operation data, as the term is used herein, refers to any type of data indicative of at least one operational aspect associated with one or more machines 110 or any of its constituent components or subsystems. Non-limiting examples of operation data may include, for example, health information such as fuel level, oil pressure, engine temperate, coolant flow rate, coolant temperature, tire pressure, or any other data indicative of the health of one or more components or subsystems of machine 110. Alternatively and/or additionally, operation data may include status information such as engine power status (e.g., engine running, idle, off), engine hours, engine speed, machine speed, location, or any other data indicative of a status of machine 110. Optionally, operation data may also include certain productivity information such as task progress information, load vs. capacity ratio, shift duration, haul statistics (weight, payload, etc.), fuel efficiency, or any other data indicative of a productivity of machine 110. Alternatively and/or additionally, operation data may include control signals for controlling one or more aspects or components of machine 110. ECM 125 may receive/collect operational information associated with an operation of machine 110 from one or more monitoring devices 121 during the execution of an assigned task.

ECM 125 may include one or more components for communicating data with one or more external devices, such as condition monitoring system 140 and/or cellular communication device 129. For example, ECM 125 may include an integrated PAN control module 126 configured to upload operation data to one or more PAN-compatible devices via a PAN connection. Alternatively or additionally, ECM 125 may include a satellite communication module (not shown) configured to distribute communicate data via a satellite communication network when a PAN connection with cellular communication device 129 is unavailable.

According to one embodiment, ECM 125 may include a data port 127 such as, for example, a serial data port or USB port, a parallel data port, an optical communication port, and/or any other type of data port. Data port 127 may be communicatively coupled to an internal memory device (not shown) and may provide an interface that allows users to access and download data stored in ECM 125 and/or storage devices associated therewith. For example, data port 127 may embody a USB or FireWire port that may be communicatively coupled with a flash memory drive. Accordingly, users may download data stored in memory of ECM 125 onto a portable USB flash memory drive and manually transfer the data to a back-end diagnostic system, such as condition monitoring system 140.

According to another example, data port 127 may include a USB port that may interface with a wireless communication dongle or other type of USB device adapted to configure USB port 127 as a wireless data communication port. As such, a PAN communication dongle 128 may be connected to ECM 125 via data port 127. Accordingly, ECMs 125 having a USB port may be retrofitted or upgraded to support PAN communications. Thus, older-model ECMs that may not be equipped with an integrated PAN communication device (e.g., integrated PAN control module 126) may be upgraded to support PAN communications without removal or replacement of the ECM.

It is contemplated that additional types of communication dongles and/or communication devices may be supported by ECM 125 to provide redundant communication systems. For example, ECM 125 may include multiple data ports 127 and may support multiple communication formats. According to one exemplary embodiment, a PAN USB dongle may be inserted into a first data port, thereby configuring ECM to support PAN communications with other PAN-compatible devices. Additionally or optionally, a WLAN USB dongle may be inserted into a second data port, thereby configuring ECM to support communications with one or more wireless internet devices that may be associated with project environment 100.

PAN control module 126 and PAN communication dongle 128 may each embody a device that is configured to identify, interface with, and support communications with one or more other PAN compatible devices, such as a PAN-compatible cellular telephone. Accordingly, PAN control module 126 and PAN communication dongle 128 (when coupled to data port 127) may be adapted to interface with a communication queue associated with ECM 125 and format messages for transmission via a PAN communication channel.

ECM 125 may be configured to communicate data with an authorized cellular communication device 129. Cellular communication device 129 may include any PAN-compatible cellular communication device such as, for example, a cellular telephone that supports PAN communications, a PAN-enabled diagnostic tool, a personal digital assistant (PDA) that supports PAN communications, a portable notebook computer with PAN-enabled technology, or any other type of PAN communication device. According to one embodiment, cellular communication device 129 may include a PAN-compatible wireless cellular telephone associated with machine operator 112 that includes customized software adapted to detect, identify, authenticate, and communicate with ECM 125. Cellular communication device 129 may include any conventional PAN-compatible cellular telephone device such as, for example, GSM, CDMA, or TDMA formatted cellular telephones. The types and formats of cellular telephone technologies listed above are exemplary only and not intended to be limiting. Accordingly, it is contemplated that additional, fewer, and/or different wireless communication formats, platforms, and technologies than those listed above may be implemented and/or integrated with the systems and methods described herein.

Cellular communication device 129 may be configured to upload data received from ECM 125 to a centralized server (e.g., condition monitoring system 140) via a cellular network 130. Cellular network 130 may include one or more devices and subsystems adapted to support a cellular communication network such as, for example, one or more cellular communication towers and/or antennae 132. Cellular network 130 may also include conventional wired or wireless networking components (e.g., wireless or wireline switches, hubs, multiplexers, demultiplexers, etc.) configured to support a cellular communication network. According to one embodiment, cellular network 130 may include one or more cellular network operations centers 134 that integrate wireless electronic components, which facilitate voice and data communication with cellular communication devices 129, with wire-based conventional networks (e.g., the Internet, land-based telephony communication networks, voice and video data networks, etc.)

Cellular communication device 129 may also be configured to receive operator skill level data from one or more subscribers 150. For example, cellular communication device 129 may include a software interface that allows users (e.g., project managers, operator training divisions, etc.) to input operator skill level information that may be loaded and stored in a cellular communication device 129 associated with the operator. According to one embodiment, operator skill level information may be loaded directly into cellular communication device 129 by an on-screen software application associated with cellular communication device 129. Alternatively or additionally, operator skill level information may be loaded indirectly by a software application associated with a subscriber computer system, which is configured to receive operator skill information in a back-end computer system and upload the information onto cellular communication device 129 via cellular network 130 and/or communication network 135.

Communication network 135 may embody any network that provides two-way communication between and/or among one or more facilities, computer systems, and/or servers such as, for example, between a cellular network operations center 134 and an off-board system (e.g., condition monitoring system 140). For example, communication network 135 may, when used in conjunction with a cellular network 130 and one or more cellular communication devices 129, communicatively couple machines 110 to condition monitoring system 140 across a cellular communication system for communicating data with one or more geographically dispersed assets (e.g., PAN, microwave, point-to-point wireless, point-to-multipoint wireless, multipoint-to-multipoint wireless.) It is contemplated that communication network 135 may include or embody any suitable wireless and/or wire-line networks such as, for example, Ethernet, fiber optic, waveguide, or any other type of wired communication network. It is also contemplated that communication network 135 may support additional communication media or communication methods such as smartcard technology, manual data transport methods (sneakernet), or any suitable means for transporting data between machine 110 and off-board systems.

Communication network 135 may also include any necessary infrastructure to support message routing and network operations. For example, communication network 135 may include various hardware and software support systems and equipment that facilitates operations of one or more communication services.

Condition monitoring system 140 may be configured to receive, store, analyze, and record operation data associated with system 120 of machine 110. For example, condition monitoring system 140 may detect one or more machines 110 associated with project environment 100. Condition monitoring system 140 may transmit a data request to ECM 125 associated with machines 110. Condition monitoring system 140 may receive operation data from ECM 125 in response to the request. Alternatively or additionally, condition monitoring system 140 may be configured to automatically receive operation data from ECM 125. For example, ECM 125 may be configured to automatically locate cellular communication device 129, establish a PAN communication channel, and transmit operation data to cellular communication device 129 via the PAN communication channel. Cellular communication device 129 may subsequently upload the operation data to condition monitoring system 140 via cellular network 130.

Condition monitoring system 140 may be any computing system configured to receive, transmit, analyze, and distribute operation data collected by system 120. As explained, condition monitoring system 140 may be communicatively coupled to one or more machines 110 via cellular communication device 129. According to one embodiment, condition monitoring system 140 may embody a centralized server and/or database adapted to collect and disseminate operation data collected by monitoring devices 121 associated with machine 110. Once collected, condition monitoring system 140 may categorize and/or filter the data according to data type, priority, chronology of receipt, etc.

Condition monitoring system 140 may include any type of processor-based system on which processes and methods consistent with the disclosed embodiments may be implemented. For example, as illustrated in FIG. 2, condition monitoring system 140 may include one or more hardware and/or software components configured to execute software programs, such as software for analyzing machine operation data and diagnosing problems associated with the machine, based on the analysis. For example, condition monitoring system 140 may include one or more hardware components such as, for example, a central processing unit (CPU) 141 or suitable processor, a random access memory (RAM) module 142, a read-only memory (ROM) module 143, a storage system 144, a database 145, one or more input/output (I/O) devices 146, and an interface 147. Alternatively and/or additionally, condition monitoring system 140 may include one or more software components such as, for example, a computer-readable medium including computer-executable instructions for performing methods consistent with certain disclosed embodiments. It is contemplated that one or more of the hardware components listed above may be implemented using software. For example, storage 144 may include a software partition associated with one or more other hardware components of condition monitoring system 140. Condition monitoring system 140 may include additional, fewer, and/or different components than those listed above. It is understood that the components listed above are exemplary only and not intended to be limiting.

CPU 141 may include one or more processors, each configured to execute instructions and process data to perform one or more functions associated with condition monitoring system 140. As illustrated in FIG. 2, CPU 141 may be communicatively coupled to RAM 142, ROM 143, storage 144, database 145, I/O devices 146, and interface 147. CPU 141 may be configured to execute sequences of computer program instructions to perform various processes, which will be described in detail below. The computer program instructions may be loaded into RAM for execution by CPU 141.

RAM 142 and ROM 143 may each include one or more devices for storing information associated with an operation of condition monitoring system 140 and/or CPU 141. For example, ROM 143 may include a memory device configured to access and store information associated with condition monitoring system 140, including information for identifying, initializing, and monitoring the operation of one or more components and subsystems of condition monitoring system 140. RAM 142 may include a memory device for storing data associated with one or more operations of CPU 141. For example, ROM 143 may load instructions into RAM 142 for execution by CPU 141.

Storage 144 may include any type of mass storage device configured to store information that CPU 141 may need to perform processes consistent with the disclosed embodiments. For example, storage 144 may include one or more magnetic and/or optical disk devices, such as hard drives, CD-ROMs, DVD-ROMs, or any other type of mass media device.

Database 145 may include one or more software and/or hardware components that cooperate to store, organize, sort, filter, and/or arrange data used by condition monitoring system 140 and/or CPU 141. For example, database 145 may include historical data such as, historic operation, status, and/or productivity data associated with one or more machines operating in the project environment 100. Performance or operational trends may be recorded and analyzed to adjust one or more aspects of machine operation to enhance the operational efficiency and/or productivity of the machine. It is contemplated that database 145 may store additional and/or different information than that listed above.

I/O devices 146 may include one or more components configured to communicate information with a user associated with condition monitoring system 140. For example, I/O devices may include a console with an integrated keyboard and mouse to allow a user to input parameters associated with condition monitoring system 140. I/O devices 146 may also include a display including a graphical user interface (GUI) for outputting information on a monitor. I/O devices 146 may also include peripheral devices such as, for example, a printer for printing information associated with condition monitoring system 140, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 147 may include one or more components configured to transmit and receive data via a communication network, such as the Internet, a local area network, a workstation peer-to-peer network, a direct link network, a wireless network, or any other suitable communication platform. For example, interface 147 may include one or more modulators, demodulators, multiplexers, demultiplexers, network communication devices, wireless devices, antennas, modems, and any other type of device configured to enable data communication via a communication network.

Condition monitoring system 140 may include one or more software applications for diagnosing problems associated with machine 110 and notifying one or more subscribers 150 (e.g., repair personnel, project managers, dispatchers, etc.). For example, software application associated with condition monitoring system 140 may be configured to analyze an operating temperature associated with an engine system. Condition monitoring system 140 may compare current (e.g., real-time) engine temperature data with a historic engine temperature trend. If the current engine temperature data exceeds the historic trend data by a predetermined acceptable amount, condition monitoring system 140 may trigger an engine temperature alarm and/or generate an event notification for distribution to one or more subscribers 150.

Subscriber 150 may include a computer system that is configured to receive data from condition monitoring system 140 in a manner consistent with the disclosed embodiments. For example, subscriber 150 may include one or more computer terminals operated by respective users. Alternatively and/or additionally, subscriber 150 may include personal data assistant (PDA) systems, wireless communication devices (e.g., pagers, phones, etc.), notebook computers, diagnostic computer systems, data analyzers, or any other such computing devices configured to receive and process information, such as operation data. In one embodiment, subscriber 150 may be associated with one or more sections of a business entity associated with managing a remote project site within project environment 100. For instance, subscriber 150 may be associated with a particular division of a business entity associated with project environment 100, such as a project management division, an operations division, a maintenance and/or repair division, a procurement division, a human resource division, and/or any other business entity that may be associated with project environment 100.

In another embodiment, subscriber 150 may be associated with a business entity that is affiliated with machine 110. For example, subscriber 150 may be associated with a site-manager that controls the operation and productivity of the machine 110. Alternatively and/or additionally, different project entities may be associated with different business entities and/or machines 110. Accordingly, the above descriptions are exemplary and not intended to be limiting. The disclosed embodiments contemplate any correlation (or none at all) between one or more business entities, and/or sections thereof, and the components of project environment 100.

Subscriber 150 may be associated with a business entity affiliated with project environment 100 and may be configured to communicate with condition monitoring system 140 and/or cellular communication device 129. In one embodiment, subscriber 150 may transmit and receive operation data to and from condition monitoring system 140 associated with one or more machines 110 operating within project environment 100. For example, subscriber 150 may be an on-site maintenance and repair division that receives alarm signals associated with one or more machines 110 from condition monitoring system 140. Accordingly, the maintenance and repair division may schedule maintenance for the machine to inspect the machine and resolve any problems that may have caused the alarm.

Subscriber 150 may also include portable communication devices associated with one or more personnel affiliated with project environment 100. For example, subscriber 150 may include a wireless pager or cell phone associated with a project manager, machine operator, dispatcher, repair technician, shift scheduler, or machine owner. As such, subscriber 150 may receive alarms and critical operational messages from condition monitoring system 140 associated with one or more machines operating within project environment 100. Accordingly, the features and systems described herein allow subscribers 150 to remotely monitor health, status, and productivity associated with one or more machines 110.

Figure 3:
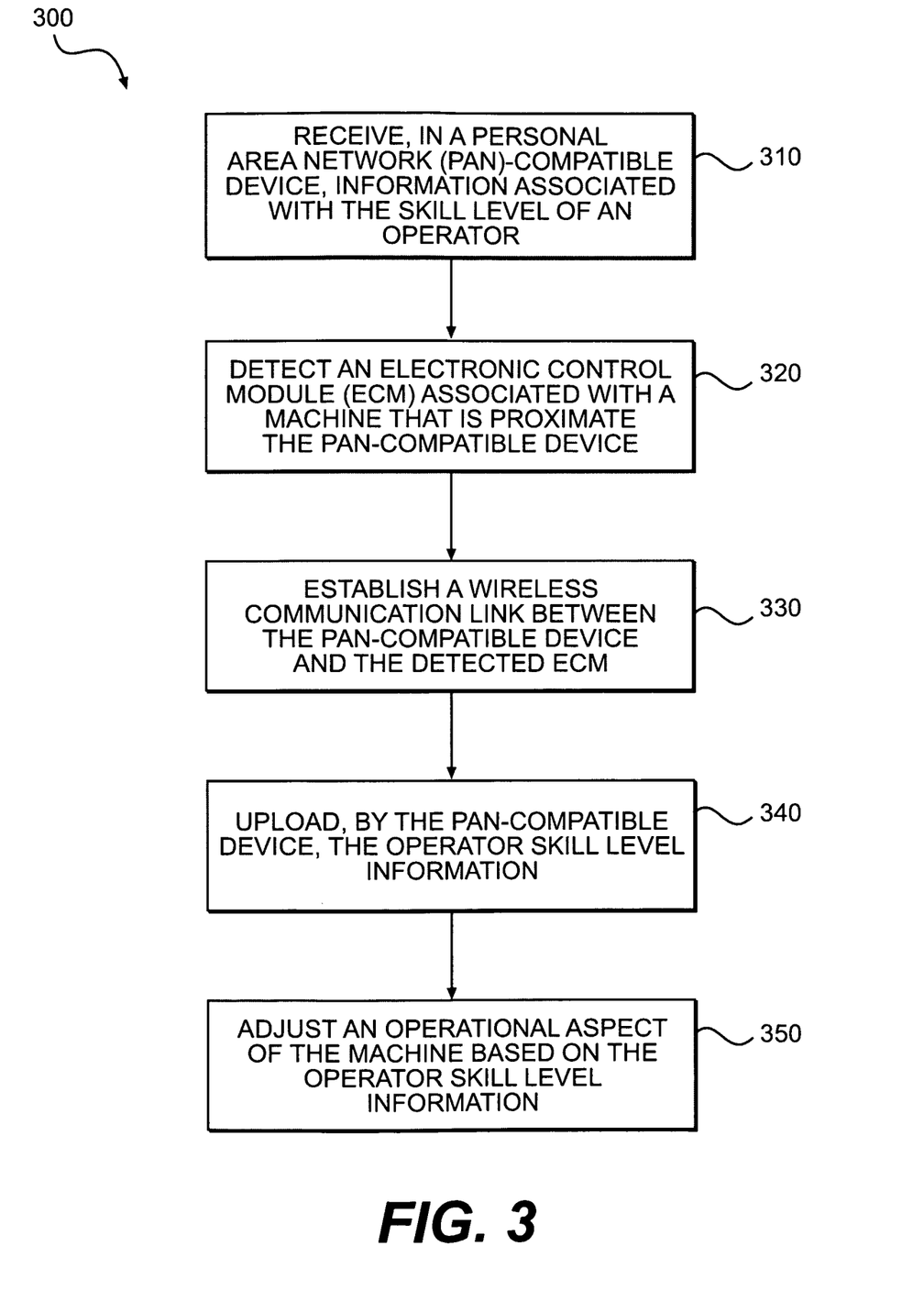
FIG. 3 provides a flowchart depicting an exemplary method for adjusting machine operating parameters based on skill level of a machine operator.

Processes and methods consistent with the disclosed embodiments provide a system for adjusting machine operations based on the skill level of an operator. More specifically, the system described herein provides a solution for programming and uploading, using specialized data synchronization software, operator skill level information to one or more machine control systems via a PAN-compatible cellular communication device. Processes and features described herein may allow a project manager to load information indicative of the operator skill level onto an operator's cellular communication device. When the cellular telephone is located within range of a compatible electronic control module of a machine, the skill level information may be uploaded onto the electronic control module, which may subsequently adjust particular operational parameters of the machine in accordance with the received information. FIG. 3 provides a flowchart 300 depicting an exemplary method for adjusting machine operating parameters based on the skill level of an operator using an operator's cellular communication device.

As illustrated in FIG. 3, information associated with the skill level of an operator may be received in a personal area network (PAN)-compatible communication device (e.g., an operator's cellular telephone) (Step 310). For example, one or more subscribers 150 (e.g., project manager, shift supervisor, etc.) may provide the information associated with the skill level of the operator using a software interface associated with the PAN-compatible communication device. This information may be provided manually by entering skill level information directly into the PAN-compatible device. Alternatively, this information may be uploaded to the PAN-compatible device via a wired or wireless link between a subscriber system and the PAN-compatible device.

According to one embodiment, a project manager may periodically upload skill level information into a computer system using a customized software interface that analyzes the skill level information to calculate an operator skill level rating. The operator skill level rating may subsequently be uploaded from the subscriber computer system to the PAN-compatible communication device using a wired link (e.g., direct USB connection between the PAN-compatible device and the subscriber computer system) or a wireless link (e.g., subscriber-based cellular network connection associated with PAN-compatible device).

Once skill level information is loaded onto the PAN-compatible communication device, an electronic control module (ECM) of a machine may be detected (Step 320). For example, PAN-compatible communication device may be configured to search for one or more ECMs within range of the PAN communication capabilities of the PAN-compatible device. If multiple ECMs are detected, PAN-compatible communication device may be configured to select the ECM that is located closest to the PAN-compatible device by, for example, determining which of the detected ECMs provides the strongest signal.

According to one embodiment, PAN-compatible communication device may be an operator's cellular telephone that is configured with Bluetooth wireless communication capabilities. When an operator of a machine comes in proximity to the machine by, for example, climbing into the cab of the machine to commence operation, the operator's Bluetooth-enabled cellular telephone may detect a Bluetooth-compatible ECM associated with the machine. During shift changes, when the machine operator exits the machine and a different machine operator enters, a Bluetooth-compatible cellular telephone associated with the second operator may address the machine ECM in substantially the same manner as the first.

Once an ECM located proximate the PAN-compatible communication device has been detected, a wireless communication link may be established between the PAN-compatible device and the detected ECM (Step 330). Establishing the wireless communication link between the PAN-compatible communication device and the machine ECM may include, for example, determining whether the PAN-compatible communication device is authorized to communication with the detected ECM and, if so, establishing a secure, encrypted wireless communication link.

Once a wireless communication link has been established between the PAN-compatible wireless communication device and a machine ECM, PAN-compatible device may be configured to upload/transmit the information indicative of the skill level of the operator to the machine ECM (Step 340). According to one embodiment, the machine ECM and/or PAN-compatible communication device may determine whether the operator is authorized to operate the machine. If the operator is authorized to operate the machine, the skill level information may be loaded onto the machine ECM. On the other hand, if the operator is not authorized to operate the machine, the machine ECM may disable the engine of the machine, thereby preventing the current operator from using the machine.

Upon receipt of the information indicative of the skill level of the operator, the machine ECM may establish/adjust one or more operational aspects of the machine based on the operator skill level (Step 350). According to one embodiment, because the weight of the machine may have a significant impact on the maneuverability of a machine, ECM may establish a payload limit for the machine based on the skill level of the operator, thereby preventing operation of the machine if the payload weight exceeds the payload limit. According to another embodiment, in order to prevent inexperienced operators from operating the machine at excessive speeds, ECM may establish a speed limit for the machine and/or disable one or more gears associated with the machine. According to yet another embodiment, certain machine features, operations, or maneuvers may require significant training to properly employ or execute such features and operations. Accordingly, ECM may be configured to disable one or more functions of the machine and/or automate one or more functions of the machine if the machine operator has not yet received the required training to operate these functions.

It is contemplated that, although certain processes and method steps described above are discussed as being performed or executed by one of the machine ECM or the PAN-compatible communication device, such processes and methods steps may be performed or executed by either of the machine ECM and the PAN-compatible communication device. It is also contemplated that certain method steps may be performed manually, without the use of machine ECM or PAN-compatible communication device.

Industrial Applicability

Systems and methods consistent with the disclosed embodiments provide a solution that enables the customization of machine operating parameters based on the skill level, experience, and training of the machine operator, without requiring the manual configuration of the machine ECM. Instead, machine operating parameters are updated/adjusted using information indicative of the operator skill level that is provided on the operator's cellular communication device. Project environments and work sites that employ the presently disclosed systems and associated methods may realize and increase in personnel productivity, as operator skill level information may only be required to be configured once—in the operator's cellular telephone. Furthermore, the systems and methods described herein may not require significant investment in additional hardware or communication infrastructure to support the disclosed features, as many machine operators already carry cellular communication devices for personal and/or professional use, which may be easily updated to include skill level interface and synchronization software.

Although the disclosed embodiments are described and illustrated as being associated with configuration of operational parameters for heavy machinery, they may be applicable to any environment that relies on the customization of operations of equipment based on the skill level of the operator. Specifically, the presently disclosed systems and methods for customizing operational parameters of a machine based on operator skill level may be applicable to any equipment system where it may be advantageous to update operating parameters of machines operating in remote project environments, where it may be impractical to manually customize controllers associated with each machine in a machine fleet. Furthermore, the presently disclosed systems and associated methods may be integrated with a connected worksite environment that monitors, analyzes, and manages operations of a plurality of machines to ensure efficient operation of the worksite.

The presently disclosed systems and methods for adjusting machine parameters based on the skill level of an operator may have several advantages. For example, the system described herein is configured to provide operator skill level information on a single device that is configured to customize operations associated with a plurality of different machine, without requiring manual customization of individual machine controllers for each operator, as in some conventional systems. Consequently, the system and method described herein may have significant cost advantages when employed in large machine fleets where manual programming of a large number of machines may result in significant machine downtime, which may decrease machine productivity.

Furthermore, the system described herein is configured to program operator skill level information onto the operator's cellular communication device, without requiring manual programming of the machine ECM. As a result, changes to the operator skill level information, no matter how frequent, may be performed off-line (e.g., at the end of an operator's shift), without interfering with machine and/or worksite productivity.

It will be apparent to those skilled in the art that various modifications and variations can be made to the disclosed systems and methods for adjusting machine parameters based on a skill level of an operator without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for adjusting machine parameters based on a skill level of an operator, comprising:
   receiving, by a personal area network (PAN)-compatible communication device, information indicative of the skill level of the operator;
   detecting a PAN-compatible electronic control module (ECM) proximate the PAN-compatible communication device; and
   transmitting the information indicative of the skill level of the operator to the detected PAN-compatible ECM, wherein the PAN-compatible ECM is configured to adjust an operational aspect of the machine in response to the information indicative of the skill level of the operator, wherein adjusting the operational aspect of the machine includes automating a function of the machine and thereby, preventing the operator from manually controlling said function of the machine.

2. The method of claim 1, wherein transmitting the information indicative of the skill level of the operator includes:
   establishing a wireless communication link between the PAN-compatible communication device and the detected PAN-compatible ECM;
   determining whether the operator is authorized to operate a type of machine corresponding with the detected PAN-compatible ECM; and
   uploading the information indicative of the skill level of the operator if the operator is authorized to operate the type of machine.

3. The method of claim 1, wherein the PAN-compatible communication device and the PAN-compatible ECM are Bluetooth-compatible devices.

4. The method of claim 1, wherein adjusting the operational aspect of the machine further includes at least one of: establishing a payload limit for the machine, establishing a speed limit for the machine, disabling one or more functions of the machine, and disabling one or more gears associated with the machine.

5. The method of claim 1, wherein transmitting the information indicative of the skill level of the operator to the PAN-compatible ECM includes transmitting the information indicative of the skill level of the operator data via a text messaging feature associated with the PAN-compatible communication device.

6. The method of claim 1, wherein the PAN-compatible communication device includes a GSM cellular communication device.

7. The method of claim 1, wherein the PAN-compatible communication device includes a CDMA cellular communication device.

8. A system for adjusting machine parameters based on a skill level of an operator, comprising:
   a personal area network (PAN)-compatible electronic control module (ECM) located on a machine;
   a PAN-compatible communication device associated with the operator of the machine and configured to:
   receive information indicative of the skill level of the operator;

establish a wireless communication link with the PAN-compatible ECM; and transmit the information indicative of the skill level of the operator to the PAN-compatible ECM;

wherein the PAN-compatible ECM is configured to adjust an operational aspect of the machine based on the information indicative of the skill level of the operator of the machine, wherein adjusting the operational aspect of the machine includes automating a function of the machine and thereby preventing the operator from manually controlling said function of the machine when the information indicative of the skill level of the operator indicates the operator has not received training related to said function of the machine.

9. The system of claim 8, wherein the PAN-compatible communication device is further configured to transmit the information indicative of the skill level of the operator to the PAN-compatible ECM via a text messaging feature associated with the PAN-compatible communication device.

10. The system of claim 8, wherein the PAN-compatible communication device includes a GSM cellular communication device.

11. The system of claim 8, wherein the PAN-compatible communication device includes a CDMA cellular communication device.

12. The system of claim 8, wherein the PAN-compatible communication device and the PAN-compatible ECM are Bluetooth-compatible devices.

13. The system of claim 8, wherein adjusting the operational aspect of the machine further includes at least one of: establishing a payload limit for the machine, establishing a speed limit for the machine, disabling one or more functions of the machine, and disabling one or more gears associated with the machine.

14. The system of claim 8, wherein the information indicative of the skill level of the operator includes information indicative of a level of training that the operator has received related to said function of the machine.

15. The system of claim 8, wherein the information indicative of the skill level of the operator includes information indicative of a level of experience of the operator.

16. The system of claim 8, wherein the information indicative of the skill level of the operator includes information indicative of a safety record associated with the operator.

17. The system of claim 8, wherein the information indicative of the skill level of the operator includes information indicative of a performance of the operator on a skills test.

18. A project environment, comprising:
at least one machine operating in the project environment;
a personal area network (PAN)-compatible electronic control module (ECM) located on the machine and configured to control at least one operational aspect of the machine;
a PAN-compatible communication device associated with an operator of the machine and configured to:
receive information indicative of the skill level of the operator;
establish a wireless communication link with the PAN-compatible ECM; and
transmit the information indicative of the skill level of the operator to the PAN-compatible ECM;
wherein the PAN-compatible ECM is configured to adjust the at least one operational aspect of the machine based on the information indicative of the skill level of the operator of the machine, wherein adjusting the at least one operational aspect of the machine includes automating a function of the machine and thereby preventing the operator from manually controlling said function of the machine.

19. The project environment of claim 18, wherein adjusting the at least one operational aspect of the machine further includes at least one of: establishing a payload limit for the machine, establishing a speed limit for the machine, disabling one or more functions of the machine, and disabling one or more gears associated with the machine.

20. The project environment of claim 18, wherein the information indicative of the skill level of the operator includes at least one of:
information indicative of a level of training that the operator has received related to said function of the machine, information indicative of a level of experience of the operator, information indicative of a safety record associated with the operator, and information indicative of the skill level of the operator includes information indicative of a performance of the operator on a skills test.

21. The project environment of claim 18, wherein the PAN-compatible communication device includes a GSM cellular communication device.

22. The project environment of claim 18, wherein the PAN-compatible communication device includes a CDMA cellular communication device.

23. The project environment of claim 18, wherein the PAN-compatible communication device and the PAN-compatible ECM are Bluetooth-compatible devices.

\* \* \* \* \*